Oct. 22, 1940.                M. O. JOHNSTON ET AL                2,218,988
                                ADJUSTABLE FLOW BEAN
                           Filed Jan. 5, 1939         2 Sheets-Sheet 1
Fig. 1.         Fig. 5.
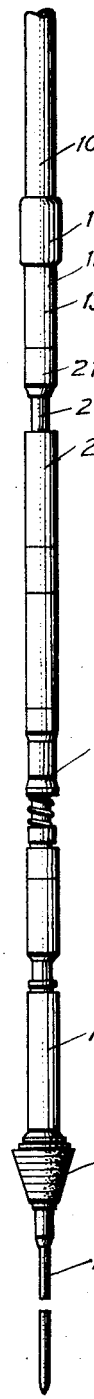
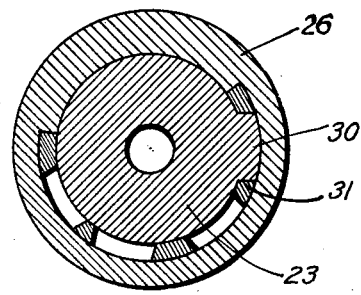
Fig. 6.
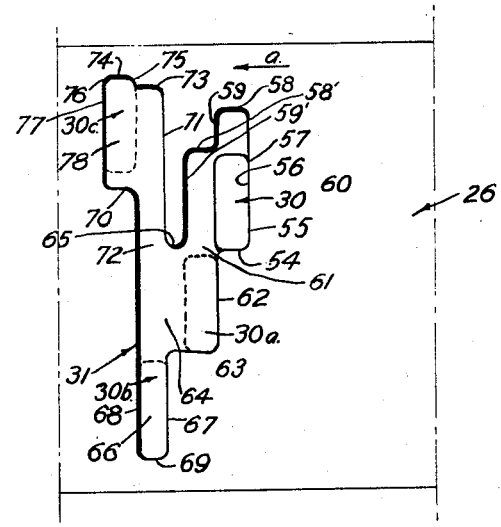
INVENTORS
MORDICA O. JOHNSTON
DAN B. CHAPMAN
BY
James W. Abbett
ATTORNEYS Oct. 22, 1940.  M. O. JOHNSTON ET AL  2,218,988
ADJUSTABLE FLOW BEAN
Filed Jan. 5, 1939  2 Sheets-Sheet 2

INVENTORS
MORDICA O. JOHNSTON
DAN B. CHAPMAN
BY
James M. Abbett
ATTORNEYS

Patented Oct. 22, 1940

2,218,988

UNITED STATES PATENT OFFICE 2,218,988

ADJUSTABLE FLOW BEAN

Mordica O. Johnston and Dan B. Chapman, Los Angeles, Calif.; said Chapman assignor to said Johnston Application January 5, 1939, Serial No. 249,411

4 Claims. (Cl. 166—1)

This invention relates to an oil well tool and particularly pertains to an adjustable flow bean.

In the operation of various oil well production apparatus it is desirable to control the flow of fluid from the well at a predetermined depth and through a string of pipe or tubing leading from the flow control device to the top of the well. It is particularly desirable to control the flow of formation fluids which enter a testing tool and which are entrapped to provide a sample of the fluid yield of a particular formation. This is especially desirable when the pressure and volume of fluid entering the tester is excessive. Under such circumstances it is common practice to provide a packer to seal off an area of the well to be tested and to thereafter release the confined fluid within that area so that it may flow into an entrapping chamber which is usually under conditions of atmospheric pressure. Under such circumstances the opening of a valve in the tester acts to release the confined fluid suddenly. This will cause it to surge violently as it flows into the entrapping chamber and will tend to act detrimentally in relieving the formation of its supporting pressure. Various instrumentalities have been provided in an effort to control the inflow of fluid from the formation to the testing chamber or into an opened flow tube. These have operated with varying success due to the fact that they are manipulated at a considerable distance from their position within the well, and that since this manipulation is usually accomplished with relative rotation of parts it is not always possible to accurately ascertain the degree of opening of the flow device.

It is the principal object of the present invention, therefore, to provide a fluid flow device or bean, as it is known to the trade, which can be readily manipulated and positively controlled so that the condition of adjustment may be known by the operator at all times so that at the conclusion of a flow period or testing operation the flow bean may be completely and positively disposed in a closed position, of which position the operator will be fully cognizant.

The present invention contemplates the provision of a sleeve within which a tubular mandrel is disposed, the tubular mandrel being closed at one end and being provided with a plurality of flow bean openings which may be masked or consecutively uncovered to establish the rate of flow of a fluid between the mandrel and the sleeve, the mandrel being connected to a string of pipe and the sleeve being connected to a string of pipe, the structure being further provided with means whereby the mandrel and sleeve may be optionally set with relation to each other by combined rotational and longitudinal movement, which positions will be readily recognized by the operator at the top of the well.

The invention is illustrated by way of example in the accompanying drawings, in which:

Figure 1 is a view in elevation showing the application of the present invention to a standard type of formation tester.

Fig. 5 is a view in transverse section through the structure as seen on the line 5—5 of Fig. 3.

Fig. 6 is a view in elevation showing the developed circumference of the lock sleeve and indicating by dotted lines various positions of the lock key therein.

Figure 2:
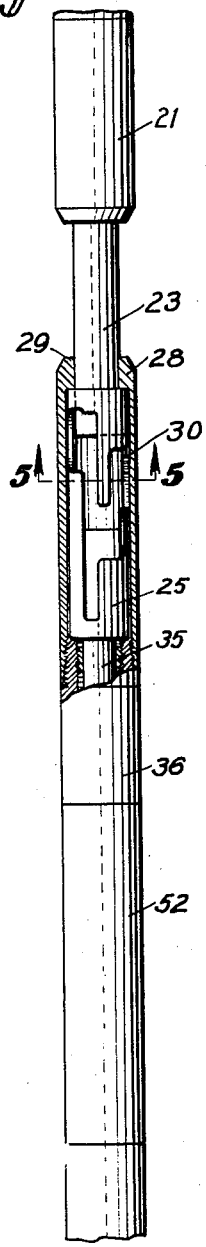
Fig. 2 is an enlarged view in central longitudinal section showing the relative positions of the parts and with the lock sleeve in elevation.

In describing the construction and utility of the present invention the device has been shown in Fig. 1 as assembled with a formation testing tool of standard type. In this particular figure, 10 indicates a drill stem lowered into a well from the well rig. 11 indicates a trip valve, such for example as shown in Johnston et al. No. 1,715,504. Such a valve is characterized by having a valve element normally closed and actuated when struck by a go-devil to be locked in an opened position.

Mounted beneath the trip valve 11 is a pipe 12 which may be of any desired length. Suspended from the pipe 12 and in communication therewith is the adjustable flow bean 13 with which the present invention is particularly concerned. To this flow bean is attached a well testing tool of standard design such as that shown in U. S. Letters Patent No. 2,073,107 entitled "Well testing method and apparatus therefor" issued to Mordica O. Johnston March 9, 1937. The structure disclosed in this patent is characterized as having a main valve which opens by longitudinal movement of the drill stem and a spring element cooperating therewith. Secured to and beneath the testing device 14 is an equalizer valve 15 which is characterized as acting to close when a packer is set and to be open when a packer is unseated. The packer to which reference is made is located at 16 and is secured beneath the equalizing valve. A perforated anchor pipe 17 is connected at the lower end of the packer, thus when all of the valves of the various instrumentalities previously described are in an open position fluid flow will be established from the formation of a well bore beneath the packer 16 and thence upwardly through the perforated anchor pipe and the various instrumentalities into the drill stem 10, where the fluid will be entrapped when the main valve in the testing tool is closed. The present invention is particularly applicable to this assembly of instrumentalities since the control of flow will be effected to prevent a violent surge of fluid from the formation into the anchor pipe and up through the assembled structure.

Figure 3:
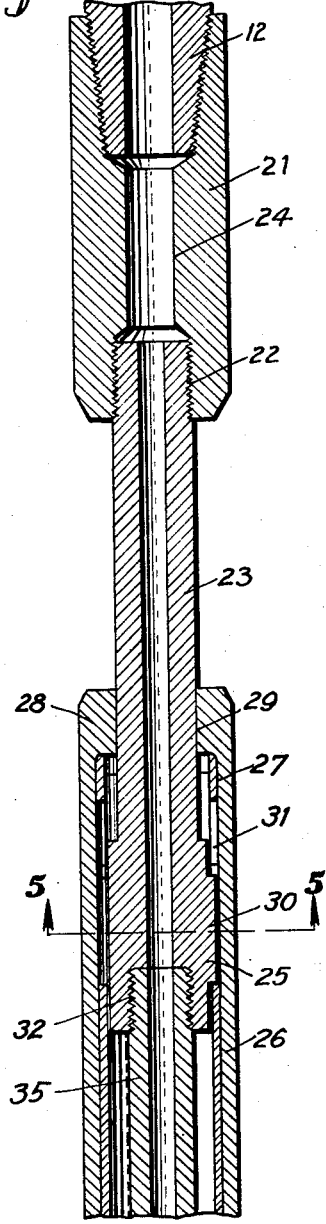
Fig. 3 is a view in central longitudinal section showing one-half of the parts in section and indicating the mandrel in its extreme opened position.
Figure 4:
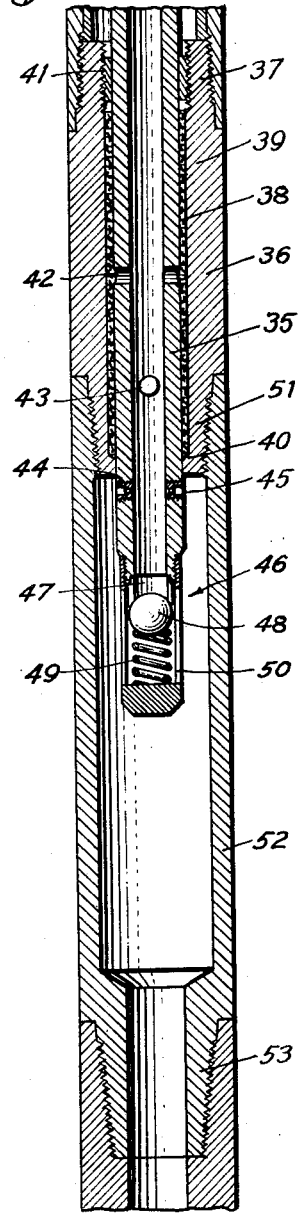
Fig. 4 is a view in central longitudinal section showing the other half of the parts in section and indicating the mandrel in its initially opened position.

Referring more particularly to Figs. 2 to 6 of the drawings, it will be seen that the adjustable flow device is here shown as comprising an upper sub 21 which may receive a pin from the length of pipe 12 or the housing of the trip valve 11. The lower end of this sub is internally threaded, as indicated at 22, and receives a mandrel section 23. This mandrel section is tubular and communicates with the passageway 24 through the sub 21. The lower end of the mandrel 23 has an enlarged portion, as indicated at 25, which fits within a lock sleeve 26. The lock sleeve 26 is in turn fastened within the bore 27 of a housing element 28. The upper end of this bore is reduced in diameter, as indicated at 29, and has a sliding fit with relation to the normal diameter of the mandrel 23. The enlarged portion 25 of the mandrel is formed with a longitudinal lock key 30, which may move along lock slots, generally indicated at 31, and formed through the wall of the lock sleeve 26. The details of construction of these slots and their functions will be hereinafter more clearly pointed out.

The lower end of the mandrel 23 is formed with a threaded counter bore 32 which receives the upper threaded end of a valve pipe 35. The valve pipe is a cylindrical tubular member which extends downwardly through a valve sleeve 36. The valve sleeve 36 has a body portion agreeing in diameter with the diameter of the housing 28 and has a threaded extension 37 which engages the threaded bore 27. The valve sleeve 36 has a central cylindrical bore 38 within which packing 39 is disposed. This packing is limited in its downward movement by an end shoulder 40 and is held in place and under compression by a tubular nut 41 which is threaded into the upper mouth of the bore 38. The packing circumscribes and forms a fluid seal with the outer circumference of the valve pipe 35. This pipe is formed with a plurality of ports, here indicated at 42, 43 and 44. The ports are formed through the wall of the valve pipe 35 and when the valve pipe is suitably retracted into the area defined by the packing 39 the ports will be closed. These ports control the rate of flow of fluid and act as flow bean ports. When desired threaded bushings 45 may be positioned within the ports and may be constructed with bean holes of suitable diameter to properly control the fluid flow.

The lower end of the valve pipe 35 is fitted with a safety circulating valve 46. This includes a valve seat 47 held in the mouth of the passageway through the valve tube 35. A valve ball 48 normally rests against this seat and seals the passageway through the same. A valve spring 49 acts to hold the ball in its closing position on the seat while a valve cage 50 holds the assembled structure in a mounted position at the end of the valve pipe 35. Thus, when an emergency arises and circulation of drilling fluid is required through the device this fluid may be forced downwardly through the mandrel 23, the valve pipe 35 and outwardly through the valve seat 47 since the fluid pressure will then be sufficient to overcome the action of the spring 49 and move the valve ball from its seat.

Mounted on the lower threaded end 51 of the valve sleeve 36 is a barrel 52 with which the valve tube 35 communicates when the circulation valve 46 is open or when the flow bean ports are unmasked. The lower end of the barrel 52 is here shown as fitted with a pin 53 which engages a suitable box connection at the upper end of the well testing device 14.

Heretofore various instruments have been designed to regulate the effective flow area through a flow bean. This, however, has usually been by the use of some type of adjusting screw which required relative rotation of the upper and lower parts of the flow bean structure. It so happens in oil well practice that the inherent resiliency of the drill-string 10 and its tendency to yield to torque action makes it difficult for the operator at the top of the well to accurately know what effect is being produced in the adjusting mechanism at the bottom of the well when the drill-string is rotated. This is particularly true when the drill-string is lowered into a cracked well bore. The present invention has, therefore, as one of its principal objects to provide adjusting means which may be intelligently manipulated by the operator at the top of the well and by the movement of which it is possible to definitely know at all times the adjusted position of the flow bean.

As heretofore set forth the present structure is shown as being designed with three flow bean openings or ports 42, 43 and 44. Under normal conditions when used with a tester, it is desirable to have one of the ports open at all times. This makes it possible to circulate through the structure if required. It is then desirable to unmask additional ports to progressively increase the volume of fluid flowing through the structure. Thus, in the present instance port 44 is normally open while the device is being run into the well bore, and thereafter ports 43 and 42 are successively opened to increase the flow area. This is done by progressively and successively lowering the mandrel 23 and the valve pipe 35 so that the flow bean ports will be disposed below the end of the valve sleeve 36 and beyond the area occupied by the packing 39. In order to accomplish this with certainty the mandrel 23 has been provided with the projecting key 30. This key extends longitudinally of the structure and fits into the keyways collectively indicated at 31. These keyways form a series of passageways into which the key 30 may be moved. By reference to Fig. 6 of the drawings it will be seen that the cutaway portion in the lock sleeve 26 provides a shoulder 54 against which the lower face 55 of the key 30 rests when the mandrel 23 has been rotated so that the side face 56 of the key 30 lies against the longitudinal face 57.

At the upper end of the face 57 and substantially at right-angles thereto is an end wall 58 which limits upward movement of the key at that point. This end wall is of width substantially the thickness of the key 30 and terminates coincident with face 59 which extends substantially at right-angles to the face 58. When the key 30 is lowered it may pass under shoulder 58' and against which the face 59' abuts when the mandrel 23 is rotated in the direction of the arrow *a*. At such a time the key 30 will be out of engagement with the shoulder 54 within register with a throat 61 through which the key may be moved downwardly to the position indicated by dotted lines at 30*a*. In this downward position the face 56 of the key lies in parallel and abutting relation to a longitudinal face 62 which extends downwardly from the shoulder 54 and terminates at its lower end in a shoulder 63. The length of the face 62 is greater than the length of the key 30, thus upon subsequent rotation of the mandrel 23 with its key 30 the key may move laterally through a throat 64 defined by an extension of the shoulder 63 and a face 65 which extends at right-angles to the face 59 and at the lower end thereof. A lower lock slot 66 is formed by a side face 67 extending downwardly from the shoulder 63 and a side face 68 which is parallel thereto and spaced laterally therefrom. The slot 66 terminates in a bottom shoulder 69 against which the lower face 55 of the key may rest, as indicated by dotted lines at 30*b*. The longitudinal face 68 extends upwardly beyond the transverse plane of the face 65 and terminates in a lateral face 70. The face 65 terminates on the opposite side from the face 59 in a longitudinal face 71 which extends upwardly and parallel to the various longitudinal faces of the lock slot structure 31. A throat 72 occurs between the faces 68 and 71. This throat is directly above the slot 66. The upper end of the face 71 terminates in a transverse face 73 at the end of which is a notch 74. This is formed by a short side face 75, an end shoulder 76 and a longitudinally extending face 77 which extends from the shoulder 76 to the face 70. The distance between the transverse faces 70 and 73 is such as to form a lateral throat 78 through which the key 30 may be moved until its side face 60 abuts against the face 77. The key may then be moved upwardly into the notch 74, as indicated at 30*c*.

It is to be understood that the lock sleeve 26 is securely fastened within the member 28 so that the key 30 may be readily manipulated by the mandrel 23 to assume the various positions. It will also be recognized that the lock sleeve 26 may be removed and replaced when it becomes worn or out of order.

Attention is directed to the fact that the key 30, as shown in solid lines in Fig. 6 of the drawings, is formed with rounded corners and that the shoulders 54 and 63 are of such a contour as to engage the end faces of the key 30 and to tend to hold the key in its set position with relation to the face 56 and the face 62 when thrust is applied to the mandrel 23. It will further be evident that when the key is in the position indicated at 30*b* it will be held against rotation in either direction and will be in its extreme lowermost position, and that when the key is in the position indicated at 30*c* it will be held against rotation in either direction and will be locked in its uppermost position.

In operation of the present invention the structure is assembled as here shown and the flow bean ports are so positioned through the wall of the valve pipe 35 as to insure that when the key 30 is in the solid line position as indicated in Fig. 6 the port 44 will be unmasked, and that when the key is in the position indicated by dotted lines at 30*a* and 30*b* the ports 43 and 42 will be successively unmasked. By this arrangement all of the ports will be unmasked and a flow of fluid will be established from the exterior of the valve pipe 35 through the flow bean ports to the interior thereof.

Attention is directed to an important detail of construction, that being the introduction of fluid into the mandrel rather than the eduction of fluid from the mandrel and into the barrel 52. The liquids found within an oil well or the drilling fluid used in a well customarily contains a large proportion of finely divided suspended solids which have an abrasive action, and since the pressure under which the fluid is confined within the well is of considerable magnitude it has been ascertained in practice that jets of this fluid projected outwardly through the flow bean ports and impinging against the wall of the barrel 52 will erode a hole through the wall of the barrel and thus render the structure useless. When, however, the lower projecting end of the valve pipe 35 is submerged within the fluid the flow of fluid is inwardly through the flow bean ports and into a relatively small space so that the pressure is damped and its force dissipated sufficiently to prevent objectionable erosion of the valve pipe 35. Assuming for the purposes of explanation that the adjustable flow bean 13 is assembled with a formation testing tool, as indicated in Fig. 1, the procedure is to lock the trip valve 11 in its closed position, after which the adjustable flow bean is set so that its key 30 is in the solid line position shown in Fig. 6 of the drawings. At this time the main valve of the testing tool 14 is held closed mechanically or by spring means indicated in Fig. 1. The structure is then lowered into the well with the drill stem 10 empty. The packer 16 is set. This is followed by the closing of the equalizing valve 15 and then the opening of the main valve of the tester 14. Fluid under native pressure exerted in the formation will then rise through the anchor pipe 17, the equalizing valve structure 15 and through the testing device 14. This fluid will then pass into the barrel 52 of the flow device and since the lower flow bean port 44 is shown as opened the fluid will flow inwardly to the passageway extending longitudinally of the valve pipe 35, then through the mandrel 23 to the drill-string 12 thereabove, where it is prevented from further flow by the closed trip valve 11. A go-devil is then dropped through the drill-string 10 to strike and open the trip valve. It will be evident that since the effective flow of fluid through the apparatus is controlled by the ports 44, which are the only ones uncovered at the moment, there will be a relatively small upward flow and there will not be a tendency for the fluid to surge through the structure as would be the case if the trip valve had been suddenly opened to the full capacity of the passageway through the mandrel 23. After a suitable amount of fluid has passed upwardly and into the test string 10 it may be desirable to increase the rate of flow. This is done by rotating the test string 10 with its mandrel 23 until the face 60 of the key 30 abuts against the face 59 of the slot 31 in the lock sleeve 26. The drill-string can then be lowered so that the key 30 will pass through the throat 61 and will move downwardly until its lower face 55 abuts against the shoulder 63. At that time the flow bean ports 43 and 44 will both be open. If additional volume is required the mandrel is again rotated in the direction of the arrow *a* so that the key 30 will move through the throat 64 and its face 60 will abut against the face 68 of the slot. The mandrel may be lowered then so that the key will move downwardly into the slot 66 and will be held against rotation in either direction so long as it is in register with this slot. At that time the lower face 55 of the key will abut against the face 69 of the slot and the flow bean ports 42, 43 and 44 will all be unmasked.

Attention is directed to the fact that when the key 30 is in position against shoulder 58 it will lock the mandrel and sleeve against rotation with relation to each other. It is also to be noted that when the key is drawn upwardly against shoulder 77 all ports which were previously opened will be closed. By lowering key 30 on to shoulder 70 the main valve of the tester may be opened. This will permit a closed in pressure test to be made if desired without unseating the packer.

It will be further noted that by turning the key 30 to face 77 this will lock the tool and prevent loss of test sample.

It is to be understood that while this operation has been described as involving the use of three flow bean ports that it is possible to vary the design so that any number of ports might be successively unmasked. Attention is also directed to the fact that if desired the port 44 may be plugged or the structure is arranged also to mask the port 44 prior to making a test. In that event the unmasking of port 44 as an initial operation will make it possible for the flow bean structure to be used as a tester.

When it is desired to remove the structure from the well the drill-string is lifted while maintaining torque in the direction of the arrow *a*, thus the key 30 will move so that its face 60 abuts against the face 77, after which further lifting action will lock the upper end of the key in the notch 74. In this position the entire structure may be rotated in either direction, thus facilitating in loosening the packer from its seat.

Attention is also directed to the fact that by the arrangement here shown the rotation to open is all in one direction so that there will not be an untwisting strain exerted upon the threads of the joints of the tool and the drill-string.

It will thus be seen that the structure here disclosed is simple and effective in producing the results desired, provides a structure which is rugged in its construction and design so that its parts are not liable to be broken and which may be definitely and intelligently manipulated to be set in a desired position and to be held or moved from this position at the will of the operator.

While we have shown the preferred form of our invention as now known to us, it will be understood that various changes may be made in combination, construction and arrangement of parts by those skilled in the art, without departing from the spirit of our invention as claimed.

Having thus described our invention, what we claim and desire to secure by Letters Patent is:

1. An adjustable flow device for oil wells and the like comprising a lower relatively fixed pipe, a tubular element connected at the upper end thereof and with which said pipe communicates, a second tubular element mounted within the first-named element and longitudinally telescoping therethrough, an upper pipe extending to the top of the well and connected with said second-named tubular element, said tubular elements being capable of relative longitudinal and rotational movement with relation to each other, a series of flow bean ports formed through the wall of the second tubular element and arranged longitudinally thereof in spaced relation to each other, means carried by the first tubular element for masking said ports whereby as the second tubular element is lowered through the first tubular element the ports will be successively unmasked and fluid from the lower pipe may flow into the second tubular element and upwardly therethrough to the upper pipe, and positive stop means between the two tubular elements whereby predetermined relative rotational and longitudinal movement between the tubular elements as manipulated by the upper pipe will unmask predetermined ports in the second tubular element.

2. An adjustable flow device for oil wells and the like comprising a lower relatively fixed pipe, a tubular element connected at the upper end thereof and with which said pipe communicates, a second tubular element mounted within the first-named element and longitudinally telescoping therethrough, an upper pipe extending to the top of the well and connected with said second-named tubular element, said tubular elements being capable of relative longitudinal and rotational movement with relation to each other, a series of flow bean ports formed through the wall of the second tubular element and arranged longitudinally thereof in spaced relation to each other, means carried by the first tubular element for masking said ports whereby as the second tubular element is lowered through the first tubular element the ports will be successively unmasked and fluid from the lower pipe may flow into the second tubular element and upwardly therethrough to the upper pipe, and positive stop means between the two tubular elements whereby predetermined relative rotational and longitudinal movement between the tubular elements as manipulated by the upper pipe will unmask predetermined ports in the second tubular element, said stop means being characterized as having a series of lateral and longitudinal shoulders carried by one tubular element and against which a stop member on the other tubular element may be moved and set.

3. An adjustable flow device for oil wells and the like comprising a lower relatively fixed pipe, a tubular element connected at the upper end thereof and with which said pipe communicates, a second tubular element mounted within the first-named element and longitudinally telescoping therethrough, an upper pipe extending to the top of the well and connected with said second-named tubular element, said tubular elements being capable of relative longitudinal and rotational movement with relation to each other, a series of flow bean ports formed through the wall of the second tubular element and arranged longitudinally thereof in spaced relation to each other, means carried by the first tubular element for masking said ports whereby as the second tubular element is lowered through the first tubular element the ports will be successively unmasked and fluid from the lower pipe may flow into the second tubular element and upwardly therethrough to the upper pipe, and positive stop means between the two tubular elements whereby predetermined relative rotational and longitudinal movement between the tubular elements as manipulated by the upper pipe will unmask predetermined ports in the second tubular element, said stop means being characterized as having a series of lateral and longitudinal shoulders carried by one tubular element and against which a stop member on the other tubular element may be moved and set, the spaces occupied by the stop member being in communication with each other whereby it may be selectively moved to a desired set position.

4. An adjustable flow device for oil wells and the like comprising a lower relatively fixed pipe, a tubular element connected at the upper end thereof and with which said pipe communicates, a second tubular element mounted within the first-named element and longitudinally telescoping therethrough, an upper pipe extending to the top of the well and connected with said second-named tubular element, said tubular elements being capable of relative longitudinal and rotational movement with relation to each other, a series of flow bean ports formed through the wall of the second tubular element and arranged longitudinally thereof in spaced relation to each other, means carried by the first tubular element for masking said ports whereby as the second tubular element is lowered through the first tubular element the ports will be successively unmasked and fluid from the lower pipe may flow into the second tubular element and upwardly therethrough to the upper pipe, and positive stop means between the two tubular elements whereby predetermined relative rotational and longitudinal movement between the tubular elements as manipulated by the upper pipe will unmask predetermined ports in the second tubular element, said stop means being characterized as having a series of lateral and longitudinal shoulders carried by one tubular element and against which a stop member on the other tubular element may be moved and set, the spaces occupied by the stop member being in communication with each other whereby it may be selectively moved to a desired set position, said shoulders being formed in the wall of a sleeve carried by the first tubular member and the stop element being rigidly carried on the second tubular member.

MORDICA O. JOHNSTON.
DAN B. CHAPMAN.